123,247

UNITED STATES PATENT OFFICE.

DOMINIQUE DURAND, OF NEW YORK, N. Y.

IMPROVEMENT IN THE MANUFACTURE OF SILVERED MIRRORS.

Specification forming part of Letters Patent No. 123,247, dated January 30, 1872.

Specification describing an Improvement in Mirrors, invented by DOMINIQUE DURAND, of New York city, in the State of New York.

The patent of Petitjean in 1856 describes a process for the manufacture of mirrors by coating the back of the glass with pure silver instead of an amalgam of quicksilver. His process, since improved in some important details, has been described in a patent issued to Henry Balen Walker, dated December 13, 1869. But the means therein described for protecting the silver, by varnishes and the like, after it has been laid upon the glass are imperfect. Walker's specification provides for laying directly upon the cleanly-washed silver surface a coating of shellac varnish, and upon that a paint of red lead. A coating of copal varnish instead of shellac makes a protection which is cheaper to produce and will endure a higher temperature.

One of the uses for which mirrors, particularly on corrugated glass, have become very important is for reflectors placed in inclined positions over gas-jets. The liability of glass so placed to become raised to a high temperature, especially at and near the upper edge of each mirror, is obvious. Notwithstanding the precautions taken to avoid placing the glass very near the flame, it is quite frequently the misfortune of the storekeeper or other person employing these reflectors to find a portion or the whole of the reflecting-surface blistered and spoiled by a temporary elevation of the temperature due to some extra-high pressure of the gas or other accidental cause. In proportion as the ability of the mirror to endure heat can be increased the glass may be placed nearer to the gas-burner, and a smaller surface of glass, and consequently a cheaper mirror, may be employed to produce the same reflective effect.

Ordinary gum damar or gum copal dissolved in spirits of turpentine in the ordinary proportions and applied with a large soft brush, the varnish as well as the glass with its silver backing being at an ordinary temperature of 60° or 70°, makes a protection which is far superior to the shellac protection or to any other known to me. It is also, as before intimated, of less cost than the shellac varnish; but this I esteem a relatively unimportant consideration. After varnishing the back of my silvered mirror with copal varnish and allowing it to harden, I paint it with red lead ground in oil and thinned with spirits of turpentine in precisely the same manner as is described in the Walker specification before referred to. But the protection afforded by the varnish and paint alone is not sufficient without some further preparation to resist the powerful attacks of sulphurous vapors, which are often or usually present over gas-burners. I have discovered and perfected an improvement which greatly increases the capacity of the mirror to withstand sulphurous and mercurial vapors. After the paint of red lead has stood about twelve hours in an ordinary dry atmosphere and has become partially dried, or what is somtimes technically denominated "tacky," I apply over it a varnish of asphaltum peculiarly prepared by long boiling with spirits of turpentine. The effect of this latter coating is partly mechanical and partly chemical. It induces a change in the character of the red-lead paint and makes it much harder and less liable to be affected by vapors. It also, by its presence outside of the paint, serves as an obvious mechanical protection thereto.

To prepare the asphaltum coating, which I term a cement, I take Trinidad asphaltum, selecting as clear and pure pieces as possible, and pulverize it finely and put twelve parts of the pulverized asphalt into thirty parts of spirits of turpentine. After allowing the materials to remain together cold for a brief period, I raise the temperature slowly in a close vessel and afterward maintain it at about the boiling point of water by immersion in a water-bath for about twelve hours, gently agitating it at short intervals. I have, in some experiments, prolonged this cooking process, and believe the effect to be somewhat increased by prolonging it, but cannot say that it is usually expedient to spend more time than this in its preparation. This is applied, with a large soft brush, at a temperature of about 180° Fahrenheit, over the partially-dried paint, the painted glass being at an ordinary temperature of 60° or 70°. This coating of cement will harden and produce its hardening effect on the paint underlying it in a very brief period, and after two hours' time is ready to be set up for use or packed for transportation.

What I claim as my invention, and desire to secure by these Letters Patent, is as follows:

1. The employment in mirrors of copal varnish next to the silver surface, thereby producing a mirror capable of enduring a higher temperature, as herein set forth.

2. The employment of the within-described asphalt cement over the paint on the back of a mirror, so as not only to increase the mechanical protection but to harden and improve the protection afforded by the paint, as herein set forth.

In testimony whereof I have hereunto set my name in presence of two subscribing witnesses.

D. DURAND.

Witnesses:
 THOMAS D. STETSON,
 PAUL FAGOT.